United States Patent
Ueno et al.

(10) Patent No.: US 8,424,926 B2
(45) Date of Patent: Apr. 23, 2013

(54) MOBILE TELEPHONE

(75) Inventors: Takaaki Ueno, Tachikawa (JP); Shinya Yasuda, Akishima (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 32 days.

(21) Appl. No.: 12/468,002

(22) Filed: May 18, 2009

(65) Prior Publication Data
US 2009/0295172 A1 Dec. 3, 2009

(30) Foreign Application Priority Data
Jun. 2, 2008 (JP) ................................ 2008-144262

(51) Int. Cl.
*E05C 5/04* (2006.01)
(52) U.S. Cl.
USPC .. 292/58; 292/59; 292/DIG. 11; 292/DIG. 38
(58) Field of Classification Search ............. 292/58–59, 292/70–71, 63–65, 240, 241, DIG. 11, DIG. 38; 174/50, 66; 70/121, 123, 135–139, 380
See application file for complete search history.

(56) References Cited

U.S. PATENT DOCUMENTS

| | | | | |
|---|---|---|---|---|
| 6,324,386 B1 * | 11/2001 | Headon | ...................... | 455/575.3 |
| 7,002,073 B2 * | 2/2006 | Lai et al. | ........................ | 174/50 |
| 7,043,282 B2 * | 5/2006 | Inomata et al. | ............ | 455/575.1 |
| 2005/0130030 A1 * | 6/2005 | Watanabe et al. | ............. | 429/100 |
| 2006/0154136 A1 * | 7/2006 | Ge et al. | ........................... | 429/97 |
| 2010/0085691 A1 * | 4/2010 | Yeh et al. | ................. | 361/679.01 |

FOREIGN PATENT DOCUMENTS

| | | | |
|---|---|---|---|
| CN | 2770102 | | 4/2005 |
| JP | 2001-053847 | | 2/2001 |
| JP | 2001-321215 | | 11/2001 |
| JP | 2004-056164 | | 2/2004 |
| JP | 2008010599 A | * | 1/2008 |
| KR | 2008-8552 | | 1/2008 |

* cited by examiner

Primary Examiner — Carlos Lugo
Assistant Examiner — Mark Williams
(74) *Attorney, Agent, or Firm* — Cozen O'Connor (57) ABSTRACT

A mobile telephone includes a casing provided with at least a locking member and a lid that can be detached or attached by pivoting of the locking member. The lid comprises a passage the locking member passes through, and a locking piece that a locking lug provided at the locking member can freely engage with and be detached from as a result of pivoting of the locking member. The locking piece is located at an inner periphery of the passage. Further, with a mobile telephone having casings that are foldably joined by a hinge, at least one of the foldably joined casings is a box-like case provided with a hinge at an upper surface and an opening portion at a rear surface, and has a lid-like case fitting to the opening of the box-like case.

4 Claims, 13 Drawing Sheets

MOBILE TELEPHONE

BACKGROUND OF THE INVENTION

1. Field of the Invention

The present invention relates to a mobile telephone equipped with a casing of a battery lid or a two-piece case.

2. Description of the Related Art

Mobile electronic device is disclosed in Japanese Patent No. 3915332 where a substantially semicircular notch is provided at an end of a battery lid. The battery lid can then be attached to and detached from the casing by using a circular lock knob at this notch. Mobile electronic device where the battery lid is fixed more reliably to the casing as a result of locking using a plurality (two) of such lock knobs at the notch of the end of the battery lid is disclosed in, for example, Unexamined Japanese Patent Application KOKAI Publication No. 2007-312255. Further, with this electronic device, the casing can also be split at substantially the middle into two pieces of an upper and lower casing (for example, refer to Unexamined Japanese Patent Application KOKAI Publication No. 2001-321215).

However, it is also necessary to provide a lock knob and to make a locking lug that engages with a locking piece provided at an inner periphery of the substantially semicircular notch of the end of the battery lid large. This is in order to ensure that the battery lid provided with the substantially semicircular notch at an end portion is reliably fixed to the casing and is disclosed in Japanese Patent No. 3915332. As disclosed in Unexamined Japanese Patent Application KOKAI Publication No. 2007-312255, fixing of the battery lid to the casing at the time of locking is stable at the notch of the end portion of the battery lid for mobile electronic device employing a number of lock knobs compared to using only one lock knob. However, more reliable fixing is desired. As disclosed in Unexamined Japanese Patent Application KOKAI Publication No. 2001-321215, reinforcing countermeasures such as the providing of an internal metal case is needed in a casing constructed of upper and lower casings that split at substantially the center, because of the difficulty to dissipate an impact, such as from dropping, to the upper and lower casings.

SUMMARY OF THE INVENTION

It is therefore an object of the present invention to provide a mobile telephone where a lid can be fixed reliably to a casing. It is a further object of the present invention to provide a mobile telephone having a casing having superior rigidity and strong resistance to shocks.

In order to resolve the above problems, the mobile telephone of the present invention has a casing provided with at least a locking member and a lid that can be detached or attached by pivoting of the locking member.

The lid comprises a passage the locking member passes through, and a locking piece that the locking lug provided at the locking member can freely engage with and be detached from as a result of pivoting of the locking member. The locking piece is located at an inner periphery of the passage.

The mobile telephone of the present invention is a mobile telephone having: casings that are foldably joined by a hinge; at least one of the foldably joined casing being a box-like case provided with a hinge at an upper surface and an opening portion at a rear surface; and a lid-like case fitting to the opening of the box-like case.

BRIEF DESCRIPTION OF THE DRAWINGS

These objects and other objects and advantages of the present invention will become more apparent upon reading of the following detailed description and the accompanying drawings in which:

FIGS. 11A and 11B are views showing a locking portion of the battery lid shown in FIG. 2 in an enlarged manner, where FIG. 11A shows an unlocked state.

FIGS. 12A and 12B are views showing the locking portion of the battery lid shown in FIG. 2 in an enlarged manner, where FIG. 12A is for illustrating a state where the battery lid is fitted at the lid-like case so as to be locked by the locking member.

DETAILED DESCRIPTION OF THE PREFERRED EMBODIMENT

Exemplary embodiment of the present invention is explained in detail in the following with reference to the drawings.

[Embodiment]

Figure 1:
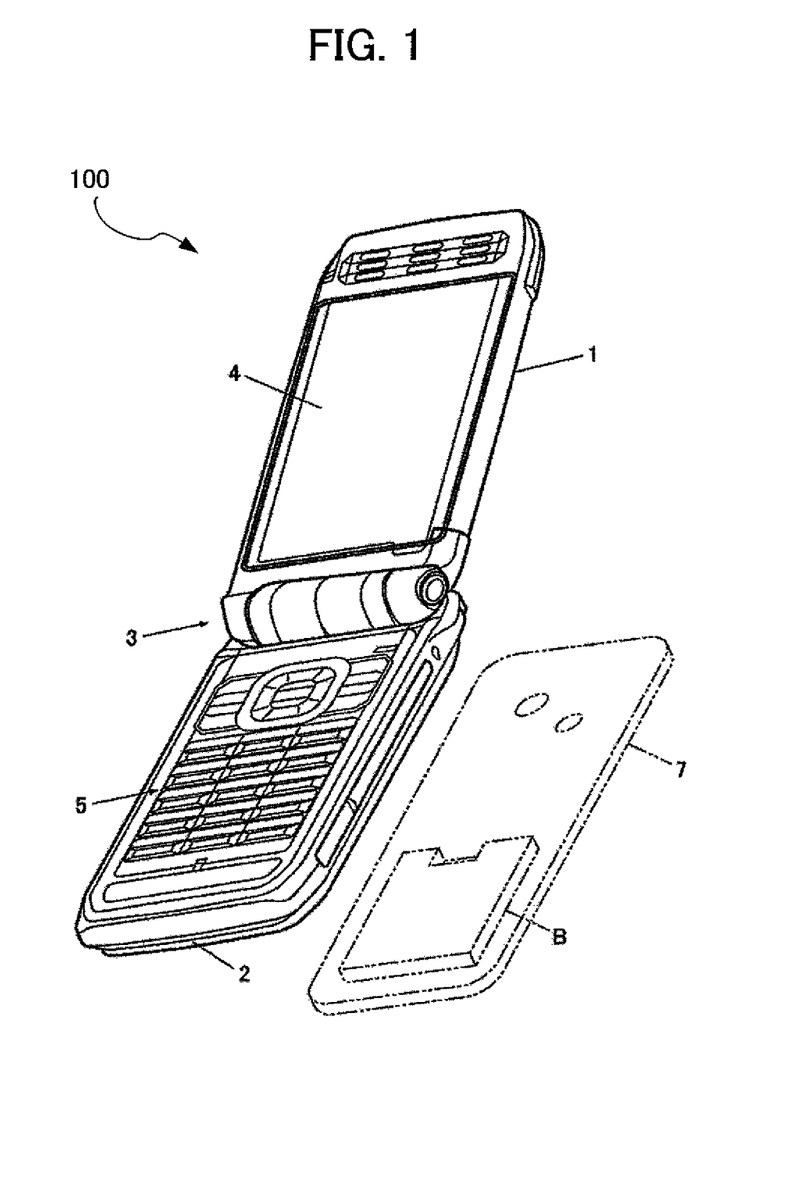
FIG. 1 shows a configuration for a first embodiment of electronic device the present invention is applied to, and is a perspective view showing a mobile telephone open in use.

As shown in FIG. 1, a mobile telephone 100 of this embodiment includes a first casing 1, a second casing 2, a hinge 3, a display unit 4, and an operation unit 5. The display unit 4 is provided at the first casing 1 and the operation unit 5 is provided at the second casing 2.

The first casing 1 and the second casing 2 constitute a foldable two-piece structure and are connected by the hinge 3.

The first casing 1 and the second casing 2 can be folded (opened and closed) via the hinge 3.

[Casing]

Figure 2:
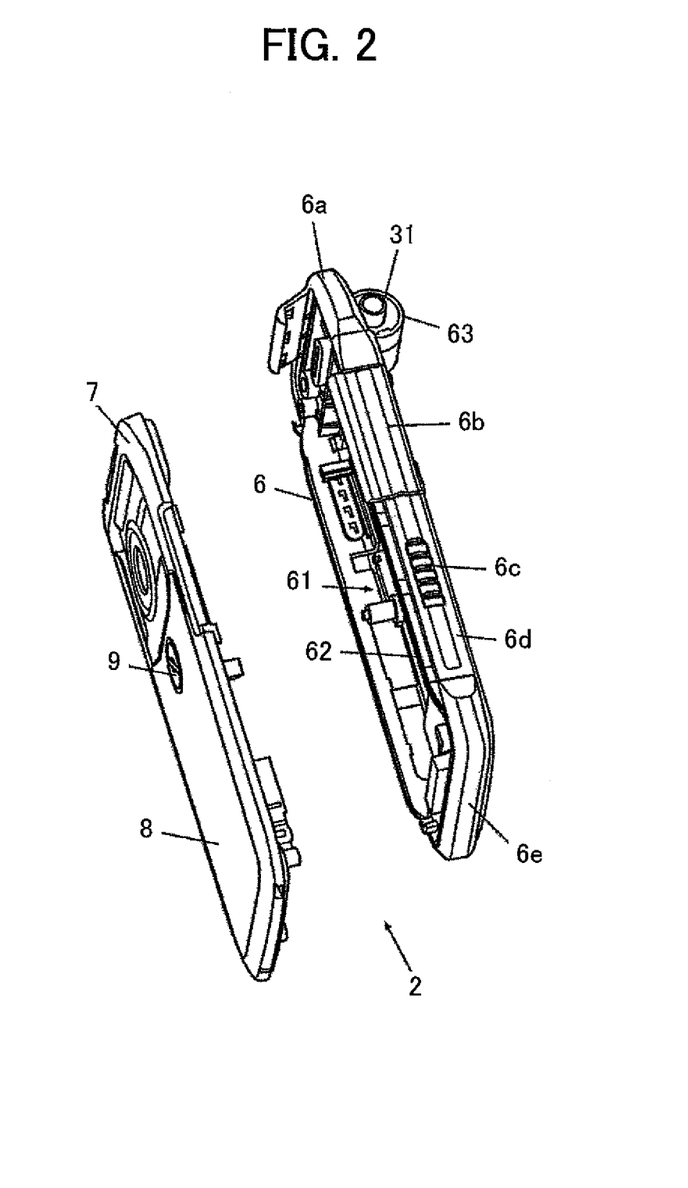
FIG. 2 is an exploded perspective view of both cases constituting the casing disassembled for one side (a second casing) of the mobile telephone shown in FIG. 1.

With the mobile telephone 100 of this embodiment, as shown in FIG. 2, the second casing 2 includes a box-like case 6, a lid-like case 7, a battery lid 8, and a locking member 9. One face of the box-like casing 6 constitutes an open portion 61, and the lid-like case 7 is fitted so as to cover the open portion 61 of the box-like case 6. The battery lid 8 can be attached to or removed from the lid-like case 7 by rotating the circular locking member 9.

[Box-Like Case]

As shown in FIGS. 3 to 5B, the box-like case 6 is formed such that the whole of one face constitutes the open portion 61. A stainless steel metal plate 62 is formed integrally using insert molding at the bottom surface of the other surface side in order to provide magnetic shielding and reinforcement etc. A pair of hinge bosses 63 is formed integrally with the box-like case 6 at one end of the outer surface of the bottom section of the box-like case 6. A packing groove 64 is also formed so as to span the entire periphery of the open portion 61.

Figure 6:
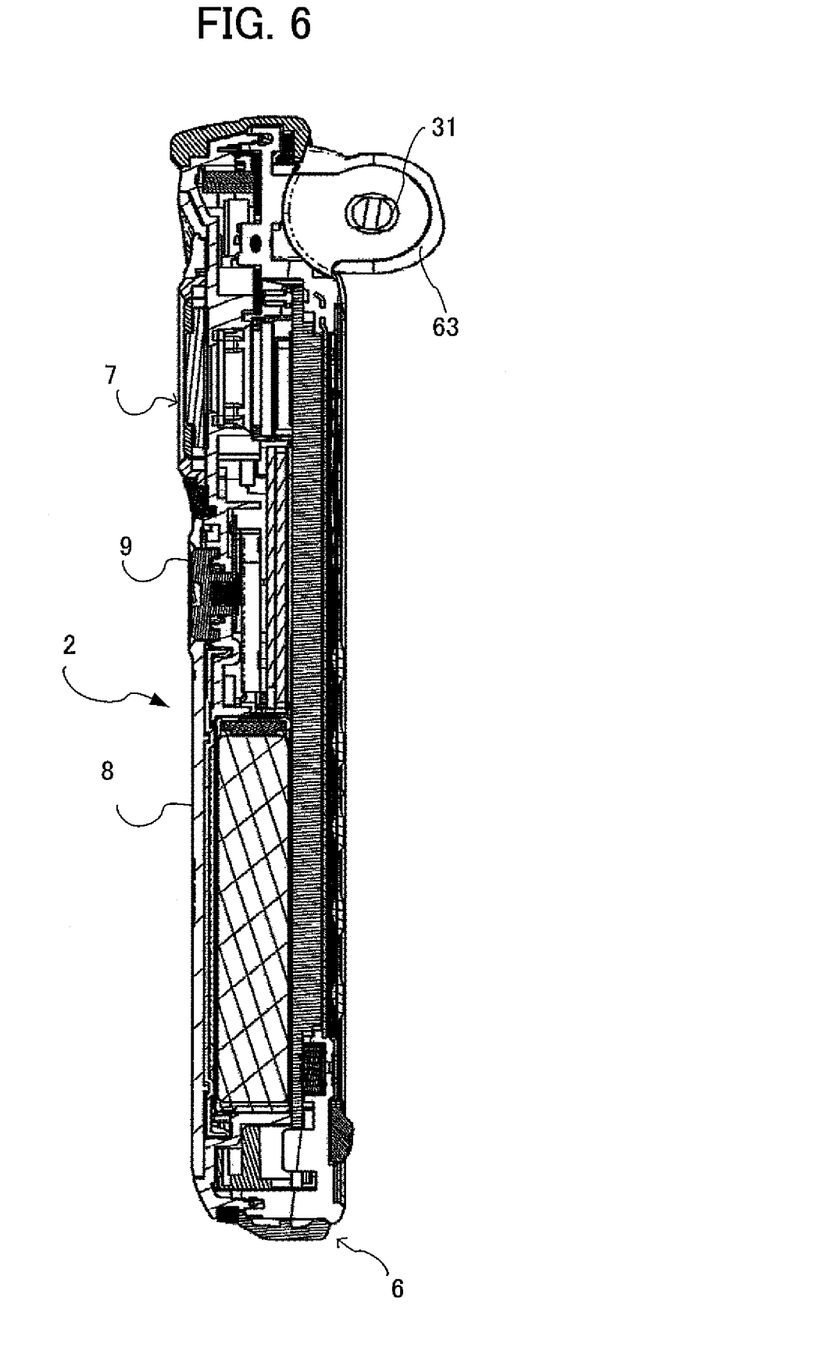
FIG. 6 is a view illustrating a situation where a substrate and other electronic components etc. are housed within a box-like case of the casing shown in FIG. 2.

As shown in FIG. 6, the box-like case 6 has a shape that is capable of housing at least the main essential components such as a substrate that is provided within the second casing 2 and other electronic components within. The lid-like case 7 is fitted so as to cover at least the open portion 61 of the box-like case 6 and has a shape that is capable of covering the box-like case 6. In this embodiment, it is possible for the substrate and the electronic components etc. to be housed collectively within at least one of the cases (the box-like case 6) of the second casing 2 that internally houses the substrate and the electronic components etc. This means that the risk of disconnections or damage to the substrate etc. is extremely small compared to a conventional mobile telephone where the internal electronic components etc. are housed so as to span two or more cases, even in the case of the application of impact force to the mobile telephone 100 from outside.

The four corners of the box-like case 6 are provided with a ribbed-structure.

This means that the structural rigidity of the case itself is strong. It is therefore possible from this viewpoint also to suppress disconnections and damage etc. as a result of making it possible to house the substrate and other electronic components etc. within the box-like case 6.

The operation unit 5 as shown in FIG. 1 can also be provided at the outer surface of the bottom part of the box-like case 6. As shown in FIG. 2, various types of garnishes 6a, 6b, 6c, 6d, and 6e are fitted at the outside (side) of the peripheral wall of the box-like case 6 so that, for example, an operation unit of keys, connectors, and jacks etc. can be provided. As shown in FIG. 2, a hinge shaft 31 is provided at the hinge bosses 63.

It is preferable for the material for the box-like case 6 to be fiber reinforced plastic (FRP) from the point of view of providing a high degree of strength, high resilience, high rigidity, and high resistance to shocks. In particular, of the fiber reinforced plastics (FRP), plastic reinforced with glass fiber etc. is preferable. Specifically, glass fiber-reinforced polyamide or polycarbonate etc. is preferable. More particularly, a synthetic resin of glass-fiber reinforced polyamide (PA) is preferable from the point of view of providing a high degree of strength, high resilience, high rigidity, and high resistance to shocks etc. It is possible to use just one type of these composite resins or to combine two or more types.

[Lid-Like Case]

As shown in FIGS. 3 to 5B, the lid-like case 7 has a shape that the case can be fitted so as to cover the open portion 61 of the box-like case 6.

It is also preferable to use the same fiber-reinforced plastic as the material for the box-like case 6 as the material for the lid-like case 7. In particular, it is preferable to use a synthetic resin of glass fiber-reinforced polyamide PA as in the case of the box-like case from the point of view of a high degree of strength, high resilience, high rigidity, and high resistance to shocks. This can be one type used independently or two or more types.

Figure 5A:
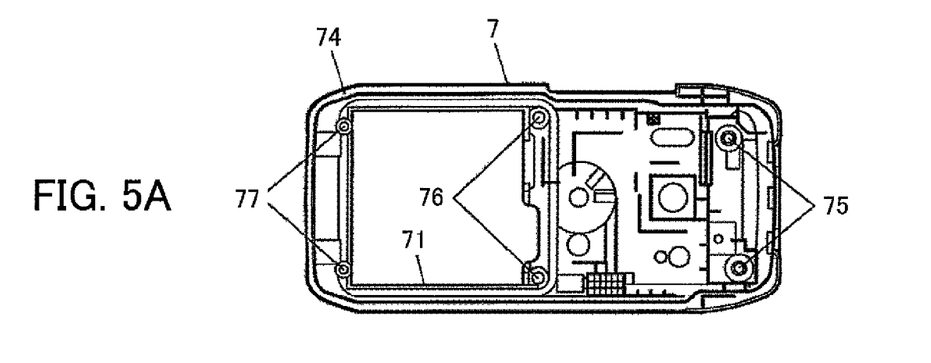
FIGS. 5A and 5B are exploded views respectively showing the cases shown in FIG. 4 with their inside faces turned up, as viewed from above.
Figure 5B:
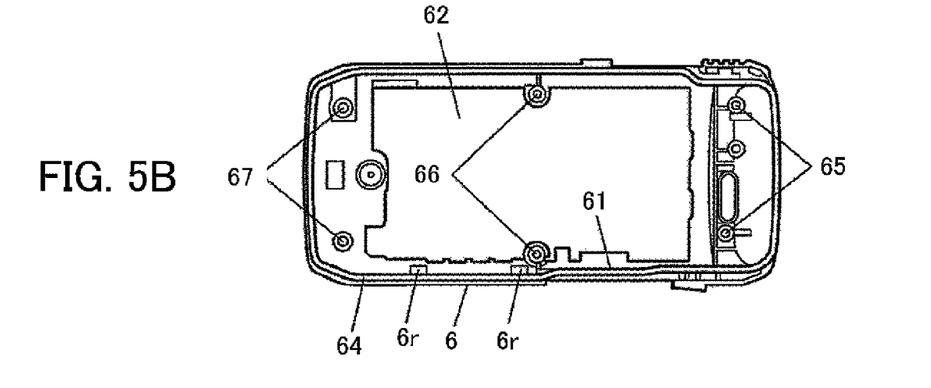

As shown in FIGS. 5A and 5B, at the lid-like case 7, a packing pressing rib 74 is formed so as to span the entire periphery at an inside surface side. This packing pressing rib 74 corresponds to the packing groove 64 at the box-like case 6. Packing (not shown) is fitted in advance at the packing groove 64 of the box-like case 6. The lid-like case 7 then covers the top of the box-like case 6. At this time, the packing is fitted in by the packing pressing rib 74 of the entire inner periphery of the inside surface of the lid-like casing 7.

Figure 3:
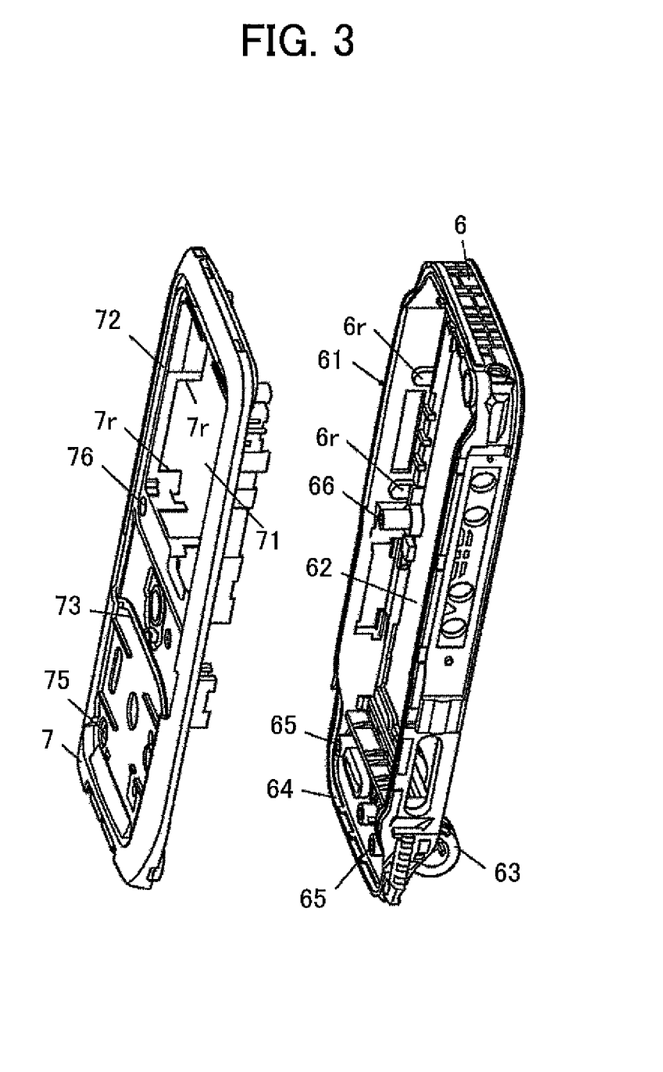
FIG. 3 is an exploded perspective view where a battery lid and a garnish are removed from both cases of the casing shown in FIG. 2 and shows both cases viewed from a side that is opposite to the side from which the casing is viewed in FIG. 2.
Figure 4:
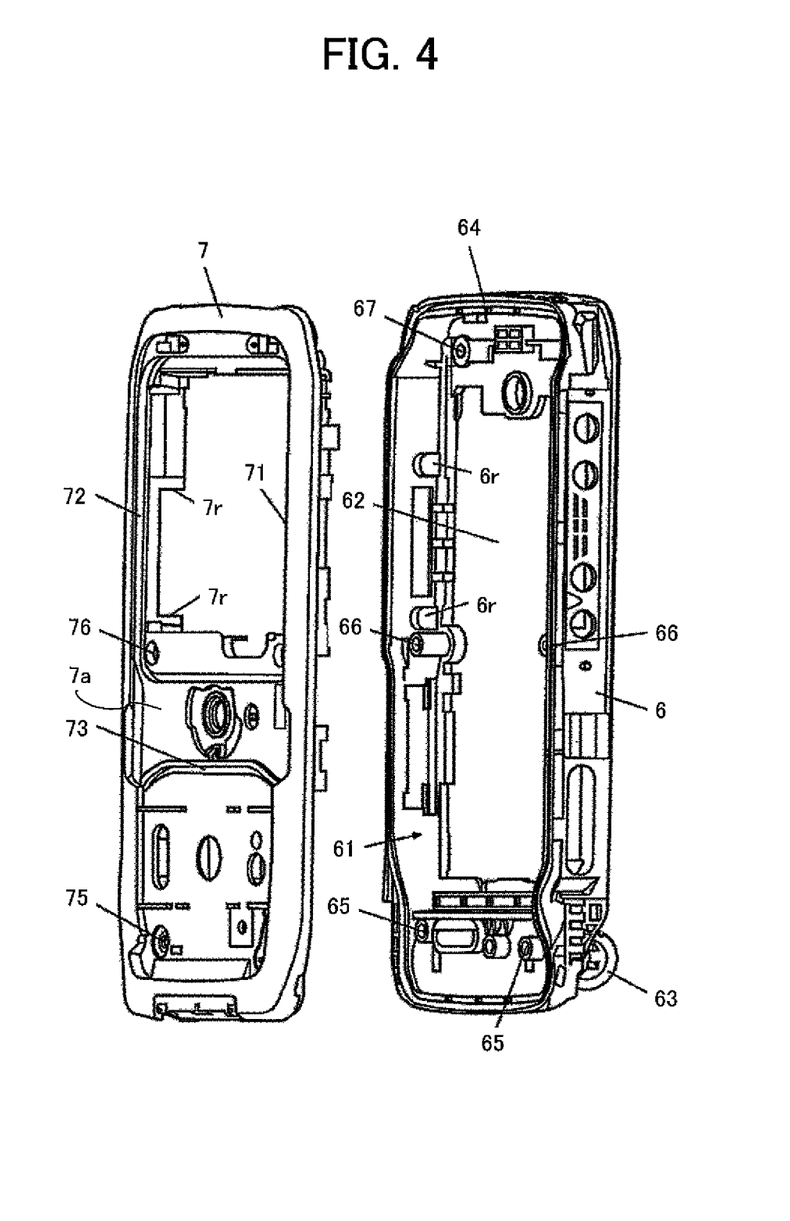
FIG. 4 is an exploded perspective view where both of the cases shown in FIG. 3 are viewed from an angle from above.

As shown in FIGS. 3 and 4, a rib 7r provided at a side of the lower portion of the lid-like case 7 and an engaging section 6r provided at the bottom surface side of the box-like casing 6 engage.

A battery attaching and detaching opening 71 and a packing groove 72 for the outer-side surface of the entire periphery are formed at substantially half of the lid-like case 7. A box-like secondary battery B is housed within the battery attaching and detaching opening 71 as shown by the imaginary line in FIG. 1.

[Casing Structure (Assembly of Box-Like Case and Lid-Like Case)]

In the assembly of the box-like case 6 and the lid-like case 7, as shown in FIGS. 3 to 5B, screws (not shown) are inserted into; a pair of mounting holes 75 provided on the opposite side of the lid-like case 7 to the battery attaching and detaching opening 71 and; a pair of mounting holes 76 provided within the battery attaching and detaching opening 71 in the vicinity of a central part of the lid-like case 7. Each of the screws is then screwed into a pair of mounting bosses 65 and a pair of mounting bosses 66 provided at corresponding positions within the box-like case 6.

At the outer side of the bottom surface of the box-like case 6, screws (not shown) are inserted from a pair of fitting holes 67 provided on the side that is opposite to the side at which the hinge bosses 63 is provided. Each of the screws is then screwed into the pair of mounting bosses 77 provided at corresponding positions within the lid-like case 7.

The packing within the packing groove 64 is therefore press-fitted by fastening the screws. It is therefore possible for the box-like case 6 and the lid-like case 7 to be stably assembled so as to constitute the second casing 2.

At the second casing 2, the box-like case 6 with one face constituting the open portion 61 and the lid-like case 7 fitted to the open portion 61 of the box-like case 6 are screw-fastened so as to be firmly fixed together. This gives a simplified casing structure where the lid-like case 7 is fitted to the box-like case 6, ensures resistance to shocks and means that the structure can be thin. It is also possible to increase strength as a result of the rib 7r provided at a side of the lower portion of the lid-like case 7 and the engaging section 6r provided at the bottom surface side of the box-like case 6 engaging with each other.

As described above, since the box-like case 6 has the structure where the hinge bosses 63 are provided at an upper face of the box-like case 6, the open portion 61 is provided at a back face and the lid-like case 7 is to be fitted to the open portion 61, the casing structure of the second casing 2 of this embodiment has an advantage from the strength aspect. The box-like case 6 is extremely rigid because of the ribbed structure adopted at its four corners. This means that even if there is an impact at the first casing 1 where a display unit 4 is provided when unfolded, force transmitted from the hinge 3 is dissipated at the box-like case 6 of high rigidity. The possibility of damage being incurred can therefore be reduced.

In addition to this, as described above, the substrate, opening for sending out the connector, and other electronic components etc. can be housed collectively in one case (box-like case 6). This is also advantageous when each case or the second casing 2 become distorted. When the substrate and the opening for sending out the connector etc. are provided dispersed at separate cases etc., there is the fear of disconnections or damage to the substrate. However, in this embodiment, this can be effectively prevented.

Moreover, operation units such as the keys, the connector, and the jack socket etc. are provided at the side of the box-like case 6. Fixing of the operation unit is therefore reinforced, reliability is possible, and the likelihood of the rigidity of the casing being damaged is alleviated.

In addition, the metal plate 62 is insert molded at the bottom surface of the box-like case 6. The rigidity of the box-like case 6 is therefore further increased by the metal plate 62 and is therefore more strongly resistant to impacts.

The hinge bosses 63 are also provided at the box-like case 6. This has the benefit that the overall rigidity of the second casing 2 can also be ensured.

This means that even if the second casing 2 is subjected to an impact, the substrate and the electronic components etc. can be effectively protected and a mobile telephone having superior resistance to shocks can be provided.

[Battery Lid]

Figure 7:
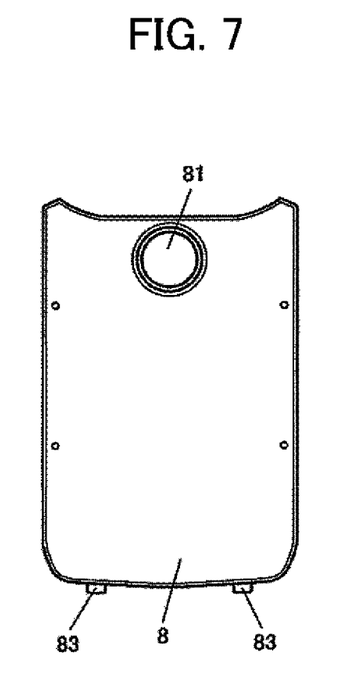
FIG. 7 is a view showing the battery lid shown in FIG. 2 as viewed from the outer surface side.
Figure 8:
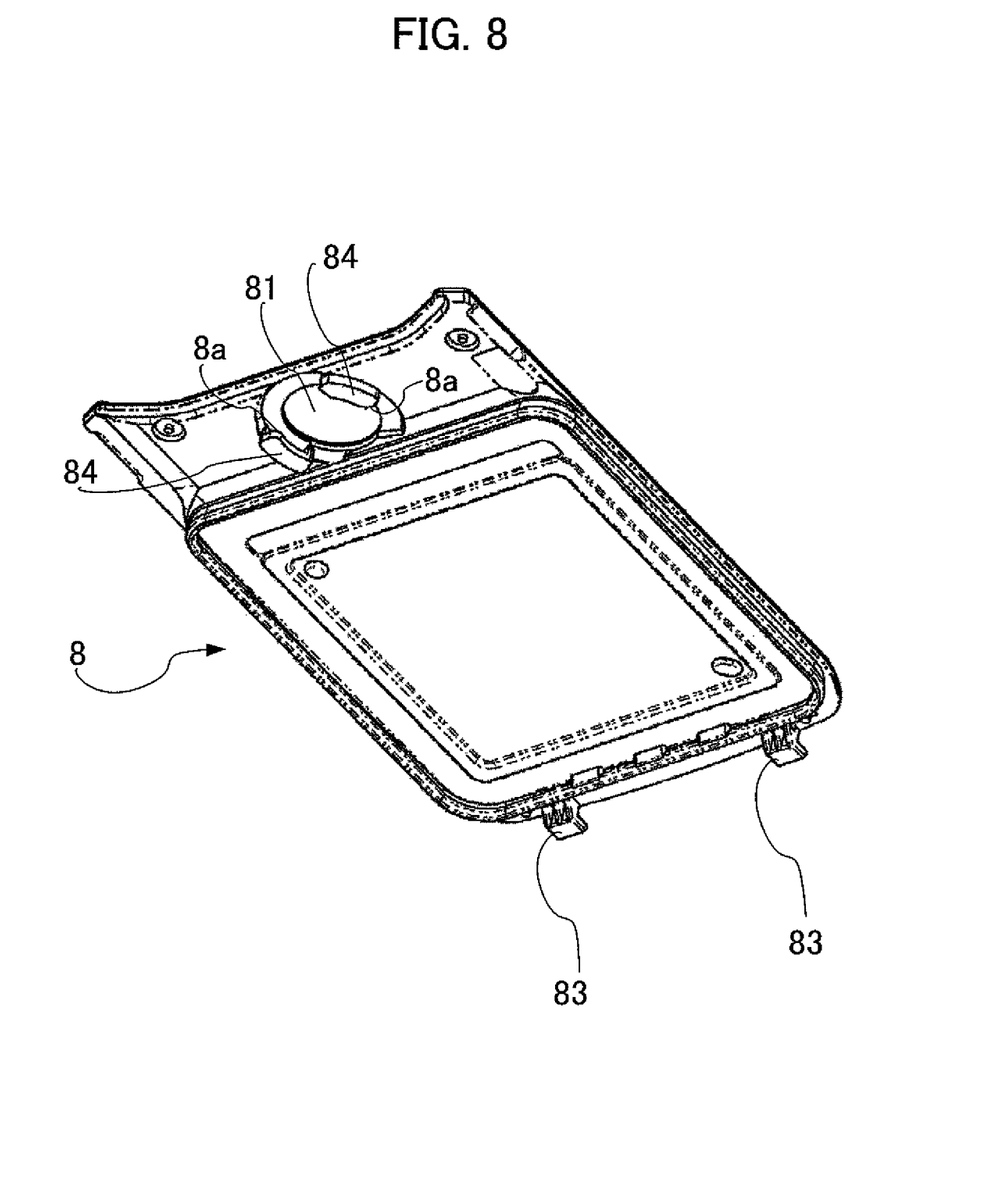
FIG. 8 is a view showing the battery lid shown in FIG. 7 reversed so as to be viewed from a side that is opposite to the side from which the casing is viewed in FIG. 7.

As shown in FIGS. 7 to 100B, in a center of an upper end portion of the battery lid 8, a circular passage 81 through which the locking member 9 described later passes is formed. As shown in FIG. 8, a pair of left and right locking pieces 84 is formed at the inner periphery of the circular passage 81 of the battery lid 8. The locking pieces 84 are formed substantially in parallel at intervals along the inner periphery of the circular passage 81 of the battery lid 8 and the battery lid 8 and the locking member 9 can freely engage and be detached by pivoting of the locking member 9.

Figure 9:
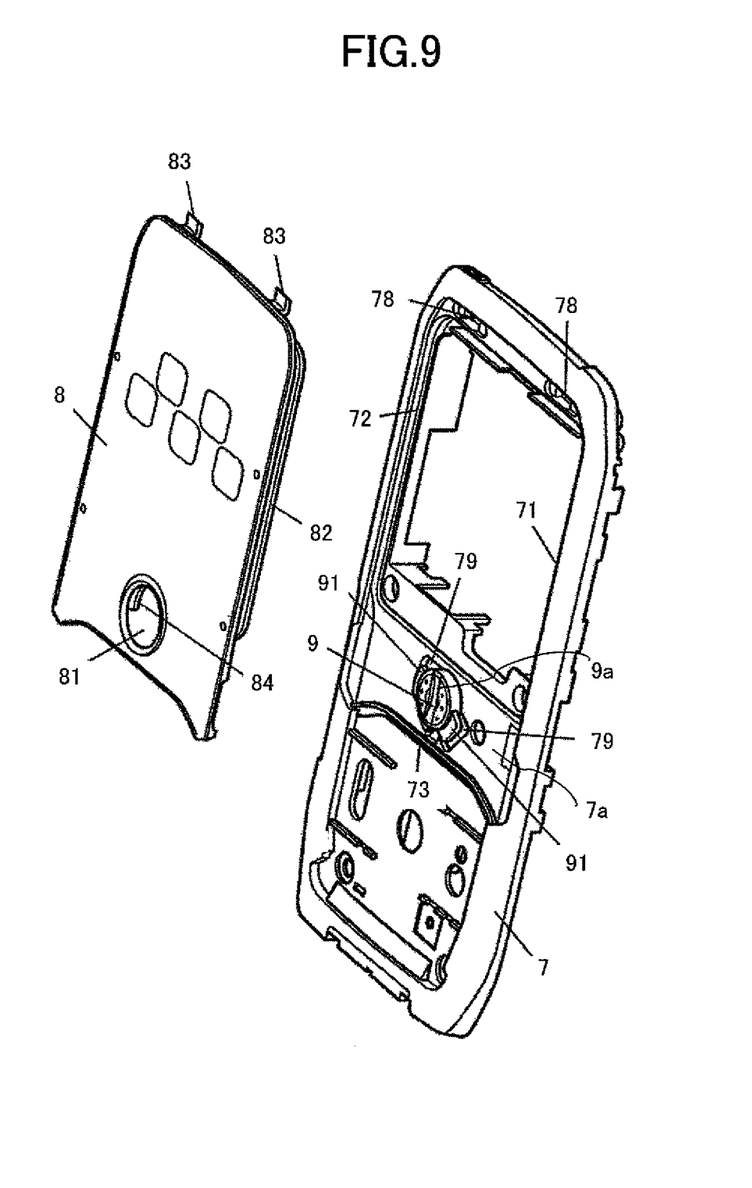
FIG. 9 is a perspective view of the battery lid and a lid-like case with the battery lid removed as shown in FIG. 2.
Figure 10A:
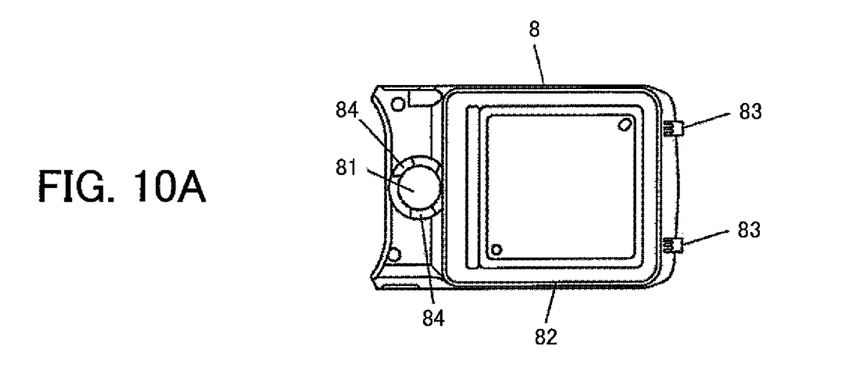
FIG. 10A shows the battery lid reversed so as to be viewed from a side that is opposite to the side from which the casing is viewed in FIG. 9.
Figure 10B:
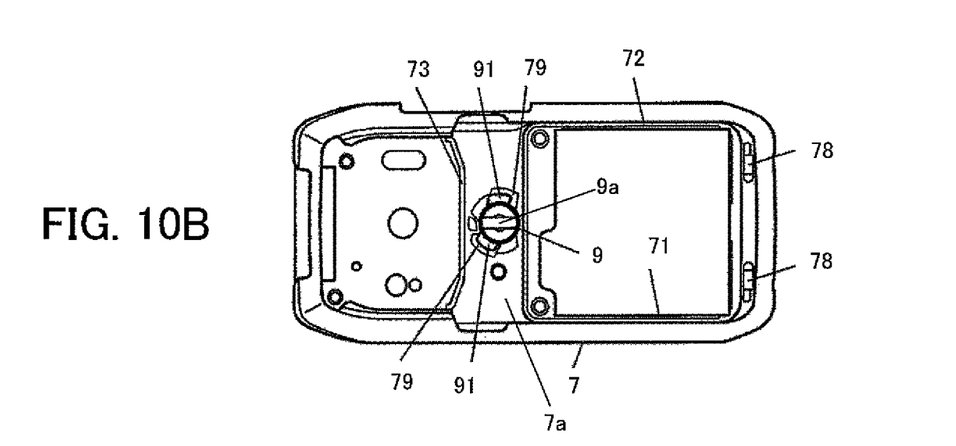
FIG. 10B shows the lid-like case as viewed from above in a state where the battery lid is removed from the lid-like case shown in FIG. 9.

As shown in FIGS. 9 and 10B, a pair of left and right insertion pieces 83 is formed so as to project at a lower end portion at the battery lid 8. The pair of left and right insertion pieces 83 correspond to a pair of left and right insertion grooves 78 formed at a lower end portion side of the lid-like case 7. Fitting packing 82 is integrally formed across the entire periphery at the packing groove 72 for the entire periphery of the battery attaching and detaching opening 71 of the lid-like case 7 at the inside surface of the battery lid 8.

[Locking Member]

Figure 11A:
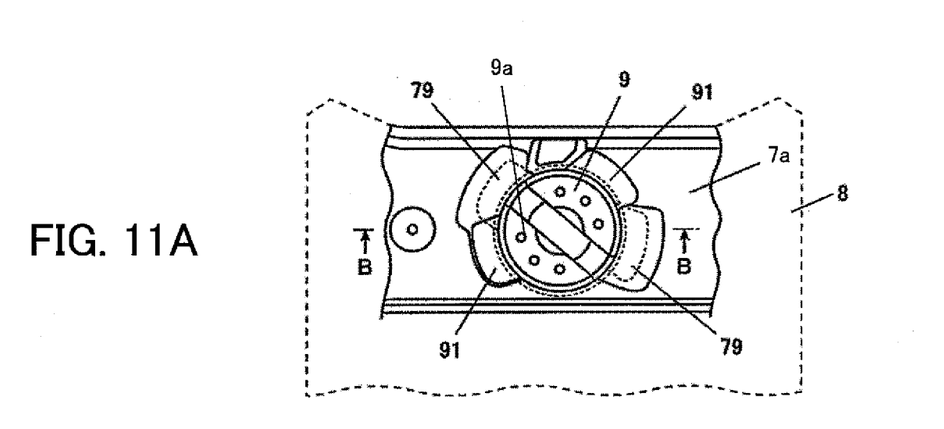
Figure 11B:
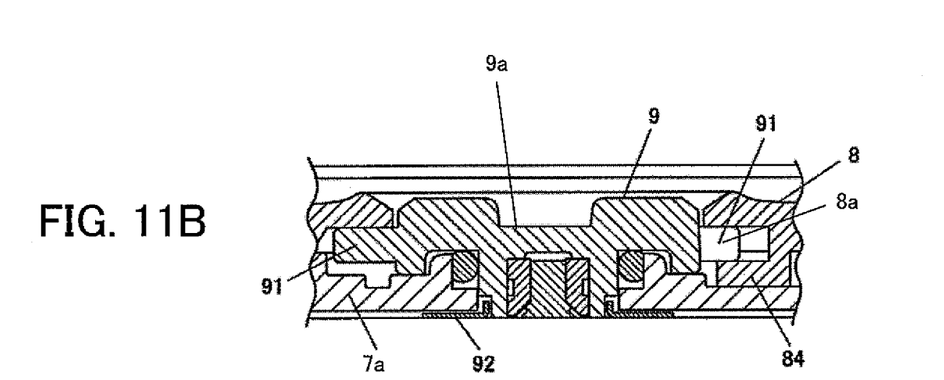
FIG. 11B is a vertical cross-sectional view taken along a line indicated by the arrows B-B of FIG. 11A.
Figure 12:
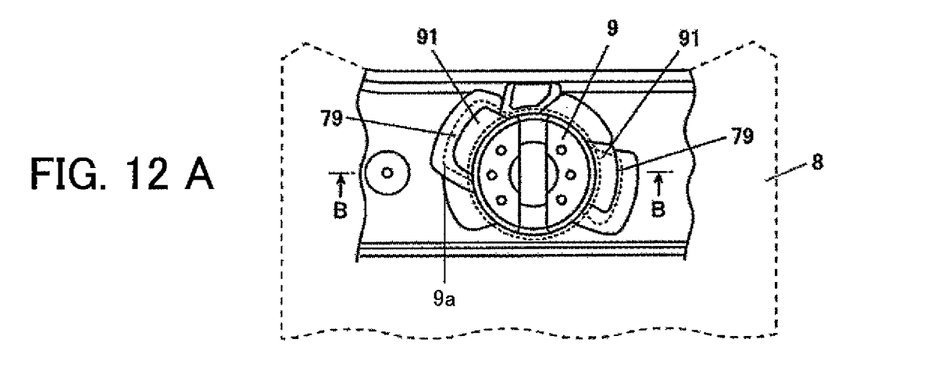
Figure 12B:
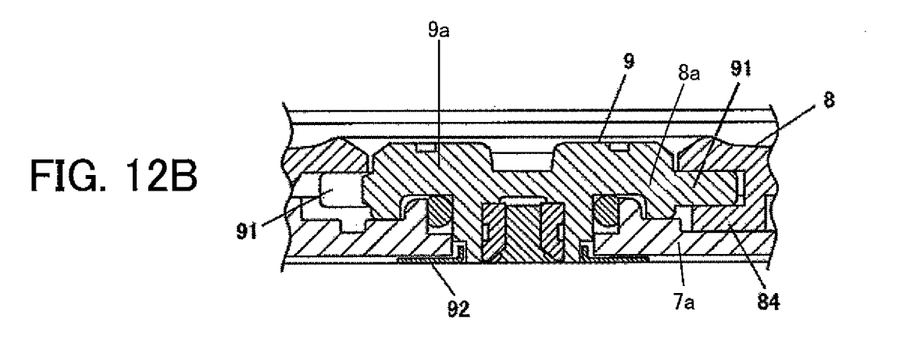
FIG. 12B is a vertical cross-sectional view taken along a line indicated by an arrow B-B of FIG. 12A in a locked state.

As shown in FIG. 9, a pair of left and right recesses 79 is formed at a region 7a vertically in a substantially central region at the lid-like case 7. The recesses 79 are positioned at the upper side of the packing groove 72 at the periphery of the battery attaching and detaching opening 71. At the region 7a of the central portion of the lid-like case 7, the locking member 9 is inserted into the circular passage 81 formed between the pair of left and right recesses 79 as shown in FIG. 11B and FIG. 12B. The locking member 9 is retained on the lower end surface of the lid-like case 7 via a stopper piece 92 by a screw, as shown in the drawings.

As shown in FIGS. 9 to 12B, a lock groove 9a for use in the pivoting operation of the locking member 9 is provided at an upper end portion of the locking member 9. The locking member 9 is integrally equipped with a locking lug 91 constituted by a pair of lugs facing a lower side external surface in a substantially diametrical direction so as to project outwards. An upper end portion of the locking member 9 is circular in shape and passes through the circular passage 81 of the battery lid 8.

Fixing of the Battery Lid by the Locking Member

In order to fix the locking member 9 to the battery lid 8, first, the locking member 9 is passed through the circular passage 81 of the battery lid 8.

As shown in FIGS. 8, 11B, and 12B, the locking member 9 is made to rotate and is fixed to the battery lid 8 as the result of a pair of lugs of the locking lug 91 engaging respectively with grooves 8a formed between the lower surface of the battery lid 8 and the locking pieces 84.

More specifically, fixing is achieved as follows. First, the pair of left and right insertion pieces 83 projecting at the lower end portion of the battery lid 8 are inserted into the corresponding pair of left and right insertion grooves 78 of the lower end portion side of the lid-like case 7. Next, the locking member 9 provided across the pair of left and right recesses 79 at the region 7a of the central part at a substantially vertically central section of the lid-like case 7 is passed through the circular passage 81 at the center of the upper end portion side of the battery lid 8.

At this time, the upper end portion of the battery lid 8 is positioned along the lower side of the edge section 73. As shown in FIG. 11A, first, the locking lug 91 is retracted to the front in a circumferential direction from the pair of left and right recesses 79. The pair of left and right locking pieces 84 of the inner periphery of the circular passage 81 of the battery lid 8 is respectively housed in the pair of left and right recesses 79.

Figure 13:
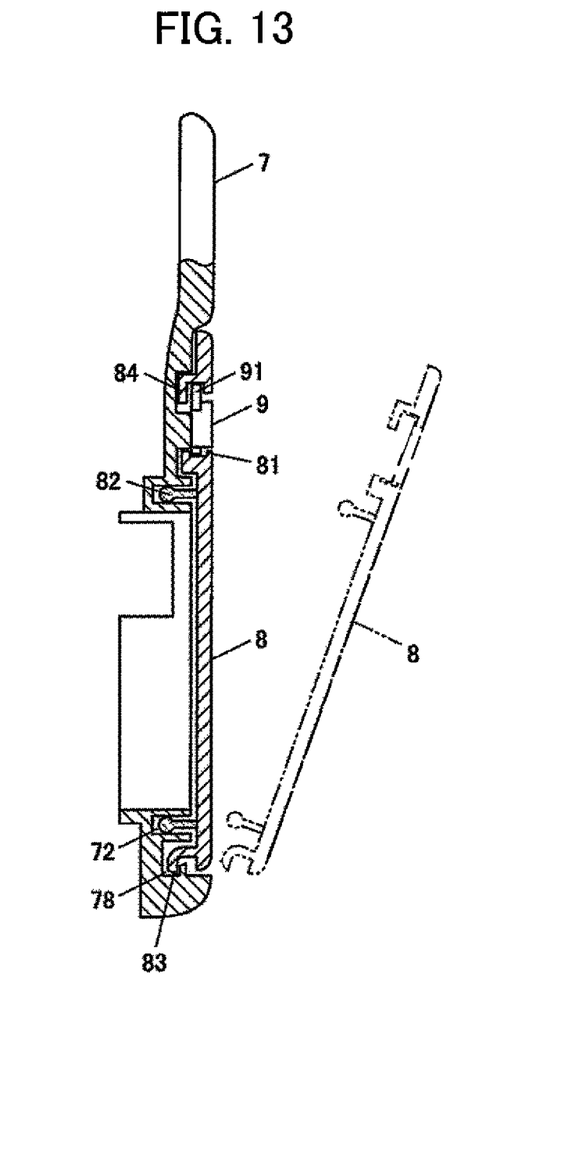
FIG. 13 is a vertical cross-sectional view showing the battery lid fitted to the lid-like case of FIG. 9.

Next, the locking member 9 shown in FIG. 11A is rotated to the right in the drawings by the lock groove 9a with a fingertip. As shown in FIG. 12B, the lugs of the locking lug 91 then respectively engage with the grooves 8a between the locking pieces 84 and the lower surface of the battery lid 8 within the pair of left and right recesses 79. The battery lid 8 that covers the battery attaching and detaching opening 71 is held fixed in a locked state with respect to the lid-like case 7 via the locking member 9. This locked state is shown in FIG. 13.

The pair of lugs constituting the locking lug 91 is formed substantially facing each other in a diametrical direction of the locking member 9. However, as can be understood from FIGS. 11A to 12B, the shape of each lug is mutually asymmetrical with respect to an axis including the lock groove 9a. The design of the shape of the lugs is carried out so that contact surface areas of the battery lid 8 and each of the lugs at the time of locking are as equal as possible and are broad. Each lug is formed at a prescribed angle of inclination with regards to the axis including the lock groove 9a.

Each lug of the locking lug 91 of the locking member 9 of this embodiment is formed in the shape described above. This means that, for example, because the width and surface area of the region 7a at the center of the lid-like case 7 have to be narrow, it is possible to provide the mobile telephone 100 where fixing of the battery lid 8 with respect to the second casing 2 is reliable even with designs that cannot ensure sufficient space for the fixing etc. of the locking member. This means that it is possible to implement stable fixing even with a small number of locking members because one locking member 9 has a plurality of (two) lugs. It is therefore possible to provide the mobile telephone 100 where fixing of the casing and the battery lid is stable and reliable even for mobile telephones that require a compact design.

[Releasing the Fixing of the Battery Lid by the Locking Member]

Conversely to that described above, when the locking member 9 shown in FIG. 12A is rotated to the left in the drawings with a fingertip using the lock groove 9a, each of the lugs of the locking lug 91 are then removed from the grooves 8a (FIG. 12B) between the locking pieces 84 and the lower surface of the battery lid 8 within the pair of left and right recesses 79. The locked state is therefore released and the battery lid 8 can be removed from the lid-like case 7.

As described above, the second casing 2 of the embodiment is in such a structure that the battery lid 8 has circular passage 81 through which the circular locking member 9 passes and by which the battery lid 8 can be attached to and detached from the casing 2 in conjunction with the circular locking member 9, and the battery lid 8 can therefore be reliably fixed with respect to the lid-like case 7 of the second casing 2 on the periphery of the circular passage 81.

That is, the pair of locking pieces 84 that the pair of locking lugs 91 facing in a substantially diametrical direction of the locking member 9 respectively engages with is provided at the inner periphery of the circular passage 81 of the battery lid 8. The battery lid 8 can therefore be firmly and reliably fixed to the lid-like case 7 by the locking lug 91 that engage with the locking pieces 84 in a substantially diametrical direction on the periphery of the circular passage 81. In other words, the locking lug 91 is flatly sandwiched by the periphery of the circular passage 81 and the locking pieces 84. The battery lid 8 can therefore be reliably fixed to the lid-like case 7.

The circular locking member 9 is positioned at the circular passage 81 at the battery lid 8. Pivoting of the locking member 9 can therefore be carried out smoothly by the circular passage 81.

The locking pieces 84 can be set at an arbitrary position utilizing the entire periphery at the inner periphery of the circular passage 81 of the battery lid 8.

It is therefore possible for the battery, the battery lid 8, and the locking member 9 etc. to be effectively protected even if the battery lid 8 or the second casing 2 are subjected to shocks because the casing structure of the second casing 2 described above is provided.

[Hinge, Display Unit, Operation Unit]

The hinge 3 connects the first casing 1 and the second casing 2 at the mobile telephone 100 of this embodiment. The mobile telephone 100 can then be folded into two via the hinge 3. The display unit 4 is provided at the first casing 1 and the operation unit 5 is provided at the second casing 2. As shown in FIGS. 1 and 2, the hinge bosses 63 of the hinge 3 is provided at the box-like case 6 of high rigidity. This means that force transmitted from the hinge 3 is dissipated at the box-like case 6 even in cases when the first casing 1 is subjected to a shock and a configuration where the likelihood of damage being incurred is reduced can therefore be achieved.

MODIFIED EXAMPLE

In addition to the above embodiment, the number, shape, and position etc. of the locking lugs and the locking pieces are also arbitrary and can be changed as appropriate for specific detailed structures.

It is also possible for the lid to be a lid for covering a housing unit etc. that houses a memory card rather than a battery lid.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2008-144262 filed on Jun. 2, 2008 and including specification, claims, drawings and summary. The disclosure of the above Japanese Patent Application is incorporated herein by reference in its entirety.

What is claimed is:

1. A mobile telephone comprising:
    a locking member comprising a locking lug;
    a lid that can be detached or attached at a first side of the lid to a casing by pivoting of said locking member with respect to the casing, the lid comprising:
        a passage through which the locking member passes;
        a first storage space arranged on a second side of the lid opposite the first side of the lid; and
        a locking piece to which said locking lug of the locking member can freely engage and disengage as a result of pivoting of the locking member, the locking piece being located at an inner periphery of the passage,
    wherein the locking member has a circular shape and the passage has a circular shape,
    wherein the locking member has two of the locking lugs and two of the locking pieces, and
    wherein the two locking lugs are asymmetrical with respect to a pivot axis of the two locking lugs, the locking member including a lock groove at the upper end portion of the locking member and
    wherein a first line from one of the two locking lugs to the axis of the locking member and a second line from another of the two locking lugs to the axis of the locking member cross at a prescribed angle of inclination.

2. The mobile telephone according to claim 1, wherein the lid is configured to provide structural rigidity to the mobile telephone.

3. The mobile telephone according to claim 1, wherein the lid and the casing are configured to form a second storage space.

4. The mobile telephone according to claim 1, wherein the locking member is rotatably attached to the lid.

* * * * *